(No Model.)

C. L. WAGANDT.
BAKING PLATE FOR PIES, &c.

No. 476,340. Patented June 7, 1892.

Witnesses:—
J. S. Barker
F. Benjamin

Inventor:—
Chas. L. Wagandt,
by H. N. Low
Atty.

UNITED STATES PATENT OFFICE.

CHARLES L. WAGANDT, OF BALTIMORE, MARYLAND, ASSIGNOR TO KEEN & HAGERTY, OF SAME PLACE.

BAKING-PLATE FOR PIES, &c.

SPECIFICATION forming part of Letters Patent No. 476,340, dated June 7, 1892.

Application filed February 6, 1892. Serial No. 420,560. (No model.)

*To all whom it may concern:*

Be it known that I, CHARLES L. WAGANDT, a citizen of the United States, residing at Baltimore city, in the State of Maryland, have invented certain new and useful Improvements in Baking-Plates for Pies, &c.; and I do declare the following to be a full, clear, and exact description of the invention, such as will enable others skilled in the art to which it appertains to make and use the same, reference being had to the accompanying drawings, and to the figures of reference marked thereon, which form a part of this specification.

It is the object of my invention to produce a vessel of thin sheet metal, preferably tin, suitable for the baking of pies, cakes, &c.

My invention especially consists in the configuration of the plate whereby it is enabled to permit a circulation of hot air beneath it, and so effectually prevent the burning of the bottom crust of the pie or other viand by which the middle of the bottom of the plate is supported, and which affords an exact mark or guide for the knife in cutting the pie for sale or distribution.

In order to make my improvement more clearly understood, I have shown in the accompanying drawings means for carrying it into practical effect.

Figure 1:
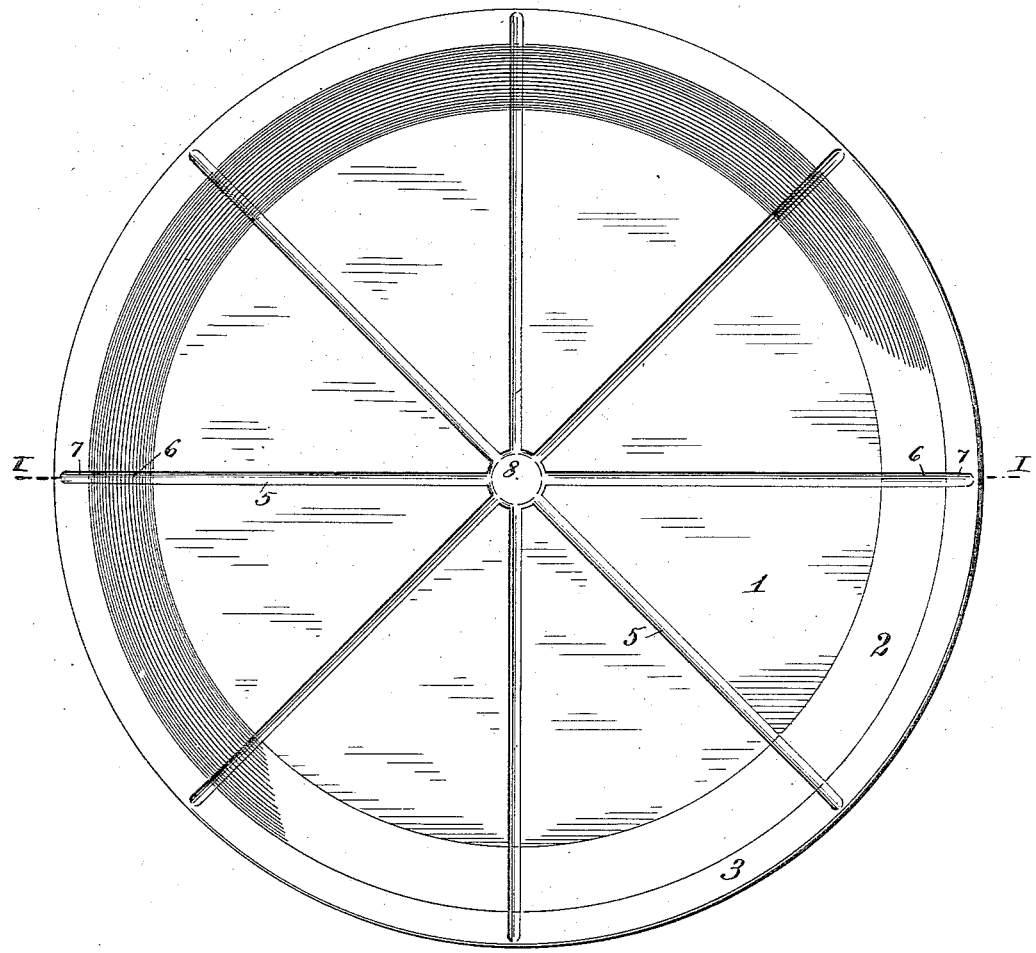
Figure 2:
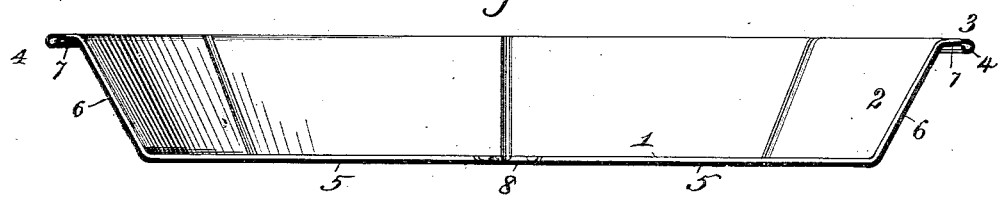

In said drawings, Figure 1 is a plan view of a baking-plate for pies embodying my invention. Fig. 2 is a transverse vertical section, partly in elevation, of the same on line I I, Fig. 1.

Referring to the drawings, 1 indicates the bottom of the plate, having a conoidal side wall or rim 2, and a horizontal flange 3 at the top of the latter. This plate is preferably formed of a single piece of tin without seam. The periphery of the rim is turned or beaded, as indicated at 4. The plate is formed with transverse or radial recesses, depressed from the upper side by suitable means during or after the manufacture of the plate, forming on the bottom of the article slightly-projecting ribs 5. These ribs form a supporting means by which the bottom 1 is held at a slight distance above the oven bottom or shelf, permitting such presence or circulation of air as will be sufficient to prevent the burning of the bottom crust of the pie and insure the even baking thereof. At the same time the bottom of the plate will be close to the heated surface of the oven and adapted to rapidly absorb a great amount of radiant heat. The radial recesses are continued beyond the bottom 1, extending up the sides or rim 2, and onto the flange 3, as indicated at 6 and 7.

When it is desired to cut the pie for sale or for serving, the recesses afford marks or guides for the knife, by following which the pie may be divided into exact, symmetrical, and equal sectors, the recesses being to this end formed at equal distances from each other.

In the plate illustrated there are eight radial depressions, (forming on the exterior of the plate ribs, as already described,) by following which the pie may be divided into two, four, or eight pieces of equal size and exact shape. At the middle of the plate the depressions or grooves may terminate in a circular or polygonal recess 8, as shown, formed similarly to and at the same time with the radial depressions.

Having thus described my invention, what I claim is—

A baking-plate for pies, cakes, &c., consisting of sheet metal having formed therein at equal distances apart depressions or recesses which extend in radial directions over the bottom, sides, and edges of the plate, and which produce upon the exterior of the bottom slightly-projecting supporting-ribs, as and for the purposes set forth.

In testimony whereof I affix my signature in presence of witnesses.

CHARLES L. WAGANDT.

Witnesses:
WM. W. RICHARDSON,
JNO. T. MADDOX,
EDWIN W. SPEAR.